United States Patent
Sinha et al.

(10) Patent No.: US 7,346,690 B1
(45) Date of Patent: Mar. 18, 2008

(54) DEFERRED PIGGYBACKED MESSAGING MECHANISM FOR SESSION REUSE

(75) Inventors: Bipul Sinha, Foster City, CA (US); Amit Ganesh, San Jose, CA (US); Lakshminarayanan Chidambaran, Fremont, CA (US)

(73) Assignee: Oracle International Corporation, Redwood Shores ( * ) Notice: Subject to any disclaimer, the term of this patent is extended or adjusted under 35 U.S.C. 154(b) by 953 days.

(21) Appl. No.: 10/160,128

(22) Filed: May 30, 2002

Related U.S. Application Data

(60) Provisional application No. 60/378,875, filed on May 7, 2002.

(51) Int. Cl.
*G06F 15/16* (2006.01)
*G06F 7/00* (2006.01)

(52) U.S. Cl. .................... 709/227; 707/10; 707/101

(58) Field of Classification Search ........... 709/227; 707/10, 101
See application file for complete search history.

(56) References Cited

U.S. PATENT DOCUMENTS

| | | |
|---|---|---|
| 4,633,387 A | 12/1986 | Hartung et al. |
| 4,980,822 A | 12/1990 | Brantley, Jr. et al. |
| 5,307,485 A | 4/1994 | Bordonaro |
| 5,325,525 A | 6/1994 | Shan et al. |
| 5,440,732 A | 8/1995 | Lomet et al. |
| 5,592,671 A | 1/1997 | Hirayama et al. |
| 5,612,856 A | 3/1997 | Albach |
| 5,675,791 A | 10/1997 | Bhide et al. |
| 5,692,182 A | 11/1997 | Desai et al. |
| 5,848,408 A | 12/1998 | Jakobsson et al. |
| 5,870,743 A | 2/1999 | Cohen et al. |
| 5,892,945 A | 4/1999 | Mirchandaney et al. |
| 5,956,704 A | 9/1999 | Gautam et al. |
| 5,970,495 A | 10/1999 | Baru et al. |
| 6,003,036 A | 12/1999 | Martin |
| 6,023,702 A | 2/2000 | Leisten et al. |
| 6,058,389 A | 5/2000 | Chandra et al. |
| 6,069,705 A | 5/2000 | Suvarna |
| 6,081,900 A | 6/2000 | Subramaniam et al. |
| 6,092,062 A | 7/2000 | Lohman et al. |

(Continued)

OTHER PUBLICATIONS

U.S. Appl. No. 10/091,618, filed Mar. 4, 2002.

(Continued)

*Primary Examiner*—Jason Cardone
*Assistant Examiner*—Tanim Hossain
(74) *Attorney, Agent, or Firm*—Hickman Palermo Truong & Becker LLP

(57) ABSTRACT

Described herein is a session reuse approach that reuses a session already established on a remote participant to execute an autonomous transaction. The session is reused in a manner that avoids affecting the session's state in a way adverse to later execution of the containing transaction. When beginning an autonomous transaction on a local participant, a request to initiate an autonomous transaction on a remote participant is deferred or not sent at all if the containing transaction is a distributed one. The request may be sent later, piggybacked to another message, using a piggyback messaging system. When ending an autonomous transaction, a local participant may send a request to a remote participant requesting that the remote participant commence execution of its respective containing transaction. The request is piggybacked to another message, and is thus transmitted without having to transmit the request separately, avoiding a message round trip.

20 Claims, 8 Drawing Sheets

U.S. PATENT DOCUMENTS

| | | | |
|---|---|---|---|
| 6,108,654 | A | 8/2000 | Chan et al. |
| 6,112,198 | A | 8/2000 | Lohman et al. |
| 6,112,225 | A | 8/2000 | Kraft et al. |
| 6,219,666 | B1* | 4/2001 | Krishnaswamy et al. ...... 707/8 |
| 6,223,182 | B1 | 4/2001 | Agarwal et al. |
| 6,240,428 | B1 | 5/2001 | Yeung et al. |
| 6,263,331 | B1 | 7/2001 | Liu et al. |
| 6,272,491 | B1 | 8/2001 | Chan et al. |
| 6,345,267 | B1 | 2/2002 | Lohman et al. |
| 6,438,562 | B1 | 8/2002 | Gupta et al. |
| 6,453,404 | B1 | 9/2002 | Bereznyi et al. |
| 6,505,227 | B1 | 1/2003 | Mirchandaney et al. |
| 6,529,906 | B1 | 3/2003 | Chan |
| 6,826,753 | B1 | 11/2004 | Dageville et al. |
| 6,920,454 | B1 | 7/2005 | Chan |
| 7,085,911 | B2 | 8/2006 | Sachedina et al. |
| 2005/0149540 | A1 | 7/2005 | Chan et al. |
| 2005/0204045 | A1* | 9/2005 | Belkin et al. ............... 709/227 |

OTHER PUBLICATIONS

Bridge, W., "The Oracle Universal Server Buffer Manager," Proceedings of the 23rd VLDB Conference, Athens Greece, 1997, pp. 590-594.

Oracle Corporation, "Introducing Oracle Parallel Server," Oracle8i Parallel Server Setup and Configuration Guide, Release 8.1.5, Chapter 1, 1999, retrieved from the internet at < http://www.csee.umbc.edu/help/oracle8/server.815/a67439/chap1.htm>, retrieved on Nov. 4, 2005, 15 pages.

Oracle Corporation, "Overview of Locking Mechanisms," Oracle8i Parallel Server Concepts and Administration, Release 8.1.5, chapter 7, 1999, retrieved from the internet at <http://www.csee.umbc.edu/help/oracle8/server.815/a67778/ch7_lock.htm>, retrieved on Nov. 4, 2005, 12 pages.

Oracle Corporation, "Integrated Distributed Lock Manager," Oracle8i Parallel Server Concepts and Administration, Release 8.1.5, chapter 8, 1999, retrieved from the internet at <http://www.csee.umbc.edu/help/oracle8/server.815/a67778/ch8_lm.htm>, retrieved on Nov. 4, 2005, 8 pages.

European Patent Office, "Communication pursuant to Article 96(2) EPC," Dated Nov. 11, 2005, 6 pages.

Current Claims, EP 99 968 071.3 8 pages.

U.S. Appl. No. 10/832,527, filed Apr. 26, 2004.

U.S. Appl. No. 11/000,818, filed Nov. 30, 2004.

* cited by examiner

DEFERRED PIGGYBACKED MESSAGING MECHANISM FOR SESSION REUSE

RELATED APPLICATION

This patent application claims priority from U.S. Provisional Patent Application No. 60/378,875, entitled "DEFERRED PIGGYBACKED MESSAGING MECHANIISM FOR SESSION REUSE", filed by Bipul Sinha, Amit Ganesh and Lakshminarayanan Chidambaran, on May 7, 2002, the contents of which are herein incorporated by reference in its entirety.

FIELD OF THE INVENTION

The present invention relates to database systems, and in addition, to efficiently executing autonomous transactions.

BACKGROUND OF THE INVENTION

An important feature of a database management system ("DBMS") is to process as a transaction a set of operations that change information in a database. A transaction is a logical unit of work that is performed as an atomic unit. In database management systems, all changes made by a transaction must be either committed or "rolled back". When a transaction is committed, all of the changes specified by the transaction are made permanent. On the other hand, when a transaction is rolled back, all of the changes specified by the transaction already made are retracted or undone, as if the changes were never made. Operations that are performed as part of a transaction are referred to herein as transaction operations.

There are two general categories of transactions on DBMSs: local transactions and distributed transactions. A local transaction is coordinated entirely within a single DBMS. A distributed transaction, on the other hand, is performed on multiple database instances, each of which executes a "subtransaction" that is part of the distributed transaction.

A distributed transaction is typically initiated on a "local" DBMS executing a "parent transaction". The local DBMS initiates a "child" subtransaction on one or more other "remote" DBMSs. The remote DBMSs may, in turn, initiate "child" subtransactions on additional remote DBMSs. The DBMSs that participate in the execution of a distributed transaction are referred to as participants with respect to the distributed transaction.

Initiating another transaction on a remote participant requires establishing a database session with the other DBMSs. A session, such as database session, is a particular connection established for a client and a computer system, such as a DBMS, through which a series of requests may be made. The requests are carried out by one or more session processes. The requests, which may be in the form of function or remote procedure invocations, include requests to begin execution of a transaction, to execute queries, to perform updates and other types of transaction operations, to commit or otherwise terminate a transaction, and to terminate a database session.

The DBMS on which a database session is established maintains session state data that reflects the current state of a database session. Such information contains, for example, the identity of the user (e.g. DBMS) for which the session was established, the session transaction state, and temporary variable values generated by processes executing software within a session. The transaction state is information about a transaction currently being executed by a process within the session.

Autonomous Transaction

Sometimes it is useful to commence and commit a transaction while in the midst of executing another transaction without having to commit or otherwise terminate the other transaction. For example, while executing a transaction for the order of a new customer, it is useful to execute and commit a transaction to register information about the customer, without having to complete processing of the order and committing information about the order.

A transaction that may be commenced and committed (or otherwise terminated) during execution of another transaction without terminating the other transaction is referred to as an autonomous transaction. When execution of an autonomous transaction begins, the other transaction is suspended. The other transaction is referred to as the containing transaction. When an autonomous transaction is terminated, execution of the containing transaction is resumed.

Unfortunately, implementing an autonomous transaction for distributed transactions has been thwarted by a problem that stems from two competing features in distributed transactions: (1) a child transaction, including autonomous transactions, are initiated on another DBMS by establishing a new database session, and (2) distributed transactions should be executed in a "location transparent" manner. Location transparency refers to the ability of the participants in a distributed transaction to execute operations of a transaction in a way that is independent of what participant executes the operations. The way operations are executed should not be affected by which participant executes the operations. To illustrate the problem and related concepts, the following example is provided.

Participants A and B are participating in a distributed transaction, each of which are executing a subtransaction A and B, respectively. During execution of the distributed transaction, participant A executes a PL/SQL™ module XFuncA. PL/SQL is a procedural database language available from Oracle corporation. XFuncA is part of a PL/SQL package. A PL/SQL package is code that defines a bundle of one or more related PL/SQL functions or procedures. A PL/SQL package defines package level objects (e.g. variables, data structures). The scope of a package level object is the package, that is, any module in a package may reference a package level object. The package level object may be accessed by a session process within a database session during execution of the package modules. A package level object is initialized when the package is first loaded by a session process within a database session. Thus, if a package defines an initial value for a variable, the value of the variable is set to the initial value defined for the variable when the package is loaded. The value stored for a variable is maintained as part of the session state of a database session.

The current example includes several scenarios that show how the behavior of a software module is affected by what participant executes an autonomous transaction during a distributed transaction. In the first scenario, function XFuncA is executed by participant A, and in the next, by participant B. Function XFuncA is part of a PL/SQL package. The package defines a variable Z, and an initial value for Z of '0'.

In the first scenario, participant A loads the package, initializing the value Z to zero. Participant A then invokes XFuncA, incrementing the value of variable Z to 1. Then participant A starts an autonomous transaction A. During execution of transaction A, participant A invokes XFuncA, incrementing the value of variable Z to 2.

In the second scenario, participant A invokes XFuncA on participant B. Participant B, after having loaded the package and initializing the value of variable Z to 0, increments the value of Z to 1.

Next, participant A starts an autonomous subtraction A. During execution of subtransaction A, participant A invokes XFuncA on participant B. In order to invoke XFuncA on participant A, participant A first establishes a database connection with participant B to initiate a child autonomous transaction. Participant B, in response, establishes another database session. Next, participant A then invokes function XFuncA through the newly established database session. Participant B, in response loads the package, initializes variable Z to 0, and increments its value to 1.

In both scenarios, XFuncA is executed twice during the distributed transaction: once in a containing transaction, and subsequently in an autonomous transaction of the containing transaction. However, the behavior of the function XFuncA is different because of where the function is executed. In the first scenario, the function is executed on participant A, and in the second scenario, on participant B. In the first scenario, the end value of Z is 2, while in the second, the end value is 1—a different result! The difference in behavior is due to the fact that in the first scenario, even though both invocations occurred in separate transactions, the invocations occurred in the same database session and therefore shared the same session state in which the value of Z is stored, while in the second scenario, the invocations occurred in different database sessions and therefore did not share the same state.

Based on the foregoing, it clearly desirable to provide a mechanism that allows execution of distributed transactions that include autonomous transactions, where the distributed transaction may be executed in a location transparent manner that is optimized for efficiency.

SUMMARY OF THE INVENTION

Described herein is a session reuse approach that may be used to execute a distributed autonomous transaction to solve the problem of location transparency. The approach reuses a session already established on a remote participant for a containing transaction, enabling use of resources already allotted to performing the containing transaction and preserving transparency of location for the autonomous transaction. The sessions are reused in a manner that avoids affecting the session's state in a way adverse to later execution of the containing transaction. When beginning an autonomous transaction on a local participant, a request to initiate an autonomous transaction on a remote participant is deferred or possibly not sent at all if the containing transaction is a distributed one. The request may instead be sent later, piggybacked to another message, by using a piggyback messaging system. If the local participant transmits a message to a remote participant to perform a transaction operation of an autonomous transaction, a request to initiate the autonomous transaction may be piggybacked to the message. Thus, the request to initiate the autonomous transaction is effected without transmitting a separate message, avoiding a message roundtrip. Furthermore, because a request to initiate an autonomous transaction on a remote participant is not made unless a transaction operation is requested for the autonomous transaction on the remote participant, the remote participant incurs the overhead of preparing an autonomous transaction only when work will be performed as part of the autonomous transaction.

The session reuse approach also reduces overhead when ending an autonomous transaction. When ending an autonomous transaction, a local participant may send a request to a remote participant requesting that the remote participant commence execution of its respective containing transaction. The request is piggybacked to another message, and is thus transmitted without having to transmit the request separately, avoiding a message round trip. In addition, if a message to begin an autonomous transaction was not sent by the local participant, the participant does not send a request to the remote participant to commence the containing transaction because there is no need to do so.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

A method and apparatus for managing session reuse is described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

Described herein is a session reuse approach that is employed to execute a distributed autonomous transaction to solve the problem of location transparency. The approach reuses, for execution of an autonomous transaction, a session already established on a remote participant for a containing transaction, enabling use of resources already allotted to performing the containing transaction and preserving transparency of location for the autonomous transaction. When beginning an autonomous transaction on a local participant, a request to initiate an autonomous transaction on a remote participant is deferred or possibly not sent at all if the containing transaction is a distributed one. The request may instead be sent later, piggybacked to another message, by using a piggyback messaging system. A piggyback messaging system is a messaging mechanism capable of transmitting one or more messages along with a requested message ("forwarding message") to a remote DBMS or other system. If the local participant transmits a message to a remote participant to perform a transaction operation of an autonomous transaction, a request to initiate the autonomous transaction may be piggybacked to the message. Thus, the request to initiate the autonomous transaction is effected without transmitting a separate message, avoiding a message roundtrip. Furthermore, because a request to initiate an autonomous transaction on a remote participant is not made unless a transaction operation is requested for the autonomous transaction on the remote participant, the remote participant incurs the overhead of preparing an autonomous transaction only when work will be performed as part of the autonomous transaction.

The session reuse approach also reduces overhead when ending an autonomous transaction. When ending an autonomous transaction, a local participant may send a request to a remote participant requesting that the remote participant commence execution of its respective containing transaction. The request is piggybacked to another message, and is thus transmitted without having to transmit the request separately, avoiding a message round trip. In addition, if a message to begin an autonomous transaction was not sent by the local participant, the participant does not send a request to the remote participant to commence the containing transaction because there is no need to do so.

Illustrative Distributed DBMS

Figure 1:
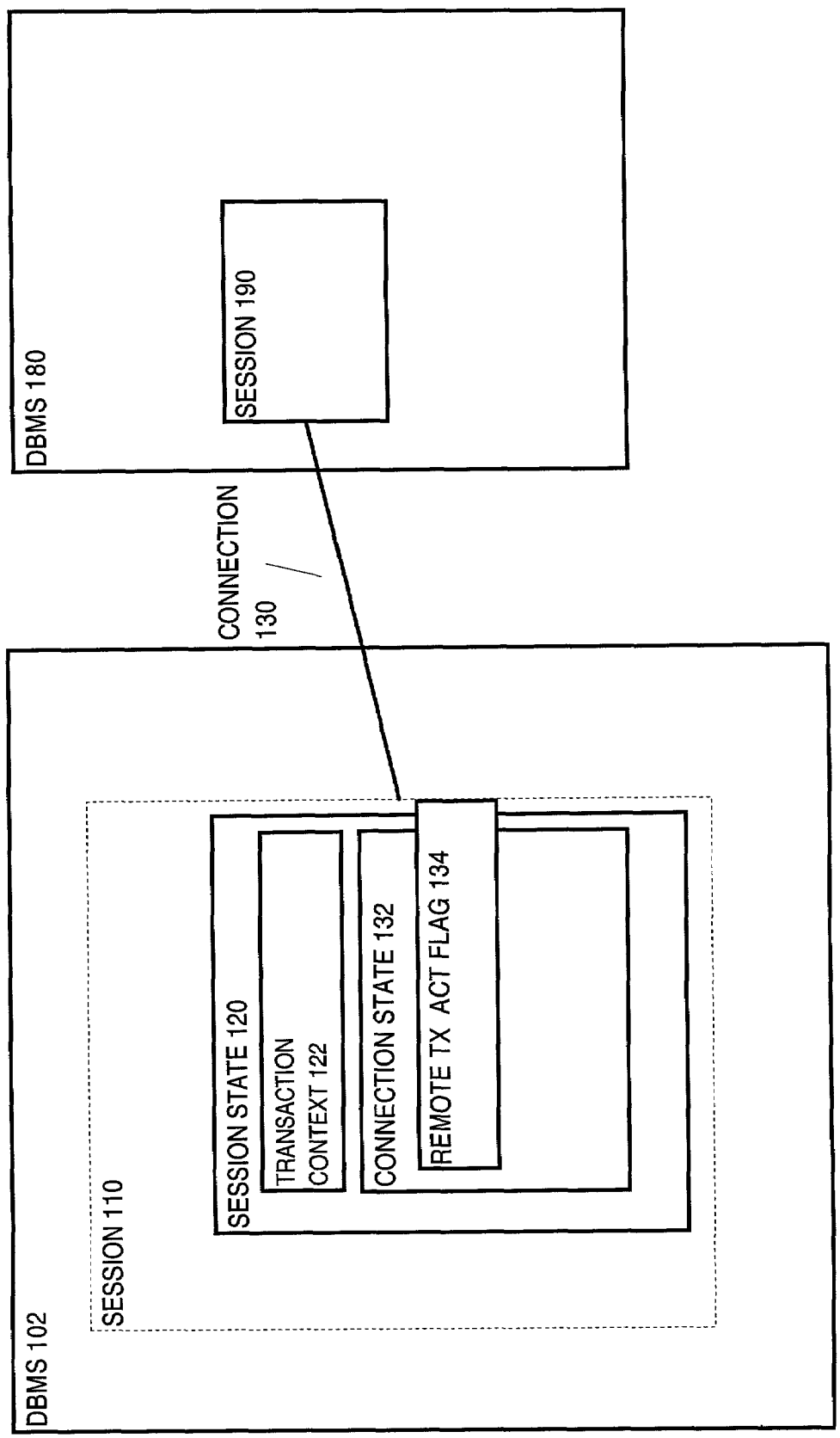
FIG. 1 is a block diagram depicting participants in a distributed transaction.

FIG. 1 is a block diagram of a distributed database system upon which an approach for session reuse that supports distributed autonomous transactions may be implemented. Referring to FIG. 1, it shows DBMSs 102 and 180, which are participants in a distributed transaction. DBMS 102 includes session 110, which has been established for DBMS 102 for a connection to a user (e.g. a client under the control of a human individual, another DBMS). Within session 110, DBMS 102 is executing transaction TX102 (not shown), which is a subtransaction of the distributed transaction.

Subtransaction TX102 is a parent of subtransaction TX180 (not shown), which is being executed by DBMS 180 in session 190. Session 190 was established for connection 130, which links DBMS 102 and 180.

DBMS 102 includes session state 120, which contains transaction state 120 and connection state 132. Transaction state 122 is data describing the "active transaction" being executed in session 110. At any given time, transaction operations executed during session 110 are executed as part of the session's active transaction. Among the information described by transaction state 122 is the identity of the active transaction and its status. Examples of statuses include ACTIVE, COMMITTED, and PREPARED (i.e. in the case of a distributed transaction for which a two phase commit is used).

A connection state, such as connection state 132, is data about a connection established with a remote DBMS by DBMS 102. Connection state 132 contains information about connection 130. This information includes remote transaction flag 134. A remote transaction flag, such as remote transaction flag 134, is a flag that indicates there is currently a transaction active on the corresponding remote DBMS. Transaction operations requested via the connection by DBMS 102 are executed in the active transaction on DBMS 180. Connection state 132 may contain other information about the state of the active transaction on the DBMS 180.

Transaction TX180 is the active transaction of session 190. TX180 is a child transaction of TX102. Thus, remote transaction flag 134 is set to indicate there is an active transaction. Like session 110, session 190 performs a transaction operation as part of session 190's active transaction, which, in this case, is child subtransaction TX180. DBMS 180 includes a session state for session 190.

For purposes of exposition, there are only two participants described in the illustration. However, a distributed transaction may include many more participants. For example, another DBMS participating in the distributed transaction may be executing a subtransaction, which was initiated by DBMS 102 as a child transaction of TX102. In this case, session state 120 contains another connection state for a connection to the other DBMS. Alternatively, the other DBMS may be executing a subtransaction, which was initiated instead by DBMS 180 as a child transaction of TX180. In this case, the session state for session 190 includes a connection state for a connection to the other DBMS.

Pushing the Session State

Before execution of an autonomous transaction can commence on DBMS 102, the DBMS must be prepared to begin execution of the autonomous transaction. Such preparation includes changing the transaction state to reflect that the autonomous transaction is the session's active transaction. Because the containing transaction may be commenced after terminating the autonomous transaction, information stored in the session state for the containing transaction is saved, to be later restored to recommence execution of the containing transaction. The information saved is "pushed" onto a stack for later retrieval. For this reason, the process of preparing the session state is referred to as a "push", "pushing" or a "push operation". Use of the term "push", however, in no way limits the present invention to the use of a stack to store session state or other data. Finally, execution of the autonomous transaction may involve work that is performed by other participants in the distributed transaction. Thus, pushing a transaction entails performing steps for coordinating with the other participants in a distributed autonomous transaction.

Figure 2:
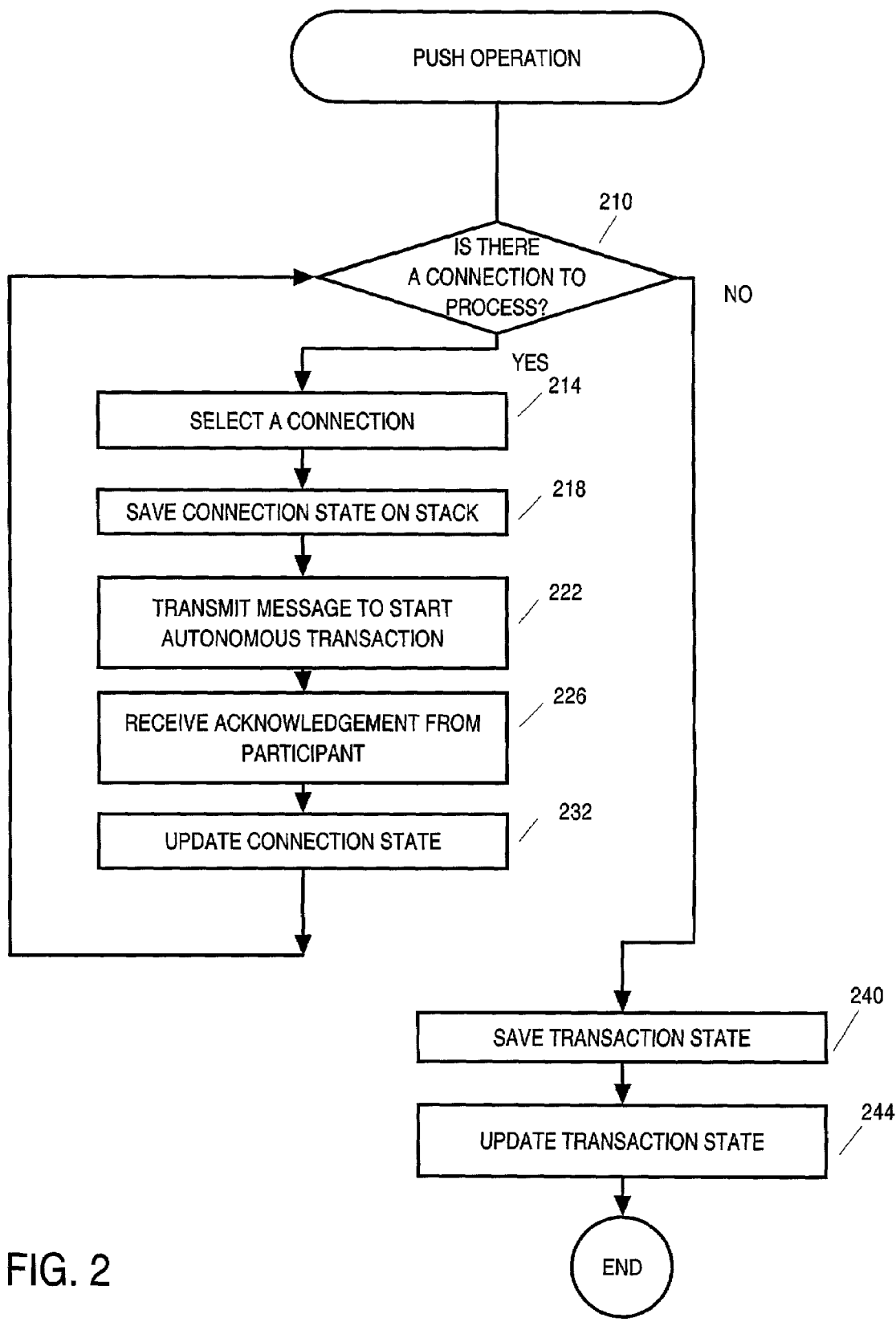
FIG. 2 is a flowchart depicting a process for session re-use for autonomous transactions.

FIG. 2 is a flowchart showing one possible approach for pushing a transaction. The steps are illustrated using DBMS 102 and 180, which are executing TX102 and TX180 in the distributed transaction. DBMS 102 has received a request to begin an autonomous transaction, and is executing the push operation depicted in FIG. 2.

Referring to FIG. 2, step 210 is part of an execution loop that is repeated for each connection that DBMS 102 has established for the distributed transaction. The loop includes steps 214, 218, 222, 226 and 232. At step 210, DBMS 102 determines whether there is a connection to process that has not already been processed in the loop. In this illustration, DBMS 102 determines that there is a connection to process, connection 130. At step 214, DBMS 102 selects connection 130.

At step 218, DBMS 102 saves the connection state onto the stack. Information saved includes, for example, the value of remote transaction flag 134.

At step 222, DBMS 102 transmits a message (via the connection) to the participant at the "other end" to initiate an autonomous transaction. In this example, DBMS 102 transmits a message to DBMS 180 to push subtransaction TX180.

In response, DBMS 180 pushes its active transaction TX180 and begins an autonomous transaction, and then transmits an acknowledgment to DBMS 102 that it has completed the push.

At step 226, DBMS 102 receives the acknowledgement. At step 232, DBMS 102 updates the connection state 132 to reflect that there is no active transaction being executed on DBMS 180.

At step 210, DBMS 102 determines there is no remaining connection to process. Execution proceeds to step 240.

At step 240, the active transaction state is saved to the stack. Information saved includes, for example, data identifying the active transaction as TX102 and its status.

At step 244, the transaction state is reset to reflect that the active transaction is the autonomous transaction.

An end result of the push operation is that the session state is made accessible to an autonomous transaction, while portions of the session state that must remain unchanged for the containing transaction are preserved in order for the containing transaction to run properly when recommenced. As shall be described in greater detail, those portions of the session state that are preserved are restored when the containing transaction is recommenced. In addition, the portion of the session state that should not be preserved in this way, and that should reflect changes made during execution of either the containing or autonomous transaction, does in fact reflect those changes.

For example, DBMS 102 may coordinate a commit of the distributed transaction. It determines the participants of the distributed transaction by examining the remote transaction flag in the connection states. Those with remote transaction flags that indicate a transaction is active are processed as participants in the distributed transaction. DBMS 102 follows this process for distributed autonomous transactions as well as for distributed transactions comprised of their containing transactions. When the autonomous transaction executes on DBMS 102, the remote transaction flag in the connection state is updated to reflect which participants have active autonomous transactions for the distributed transaction. If the connection states are not restored to reflect the state that existed before the autonomous transaction commenced within the containing transaction, then information in the connection states is incorrect for the containing transaction. By saving the connection states for the containing transaction, they can be reset to the correct state needed by the containing transaction before it is recommenced.

On other hand, both the containing transaction and the autonomous transaction on DBMS 102 may change package level objects, which are also part of the session state. Such objects should reflect changes made during execution of both the containing transaction and the autonomous transaction, and should be accessible during the execution of both.

Reducing Overhead Piggybacked Session Reuse

While the push operation shown preserves portions of the session state for the containing transaction, it does so at the cost of additional overhead, which occurs in several forms. First, there is the inter-process traffic between DBMS 102 and DBMS 180 to transmit a message to request initiation of an autonomous transaction and acknowledgement that the request has been honored. The request and the acknowledgement may occur over a network. Second, the autonomous transaction on DBMS 180 may be initiated without work ever having been performed as part of the transaction.

Figure 3:
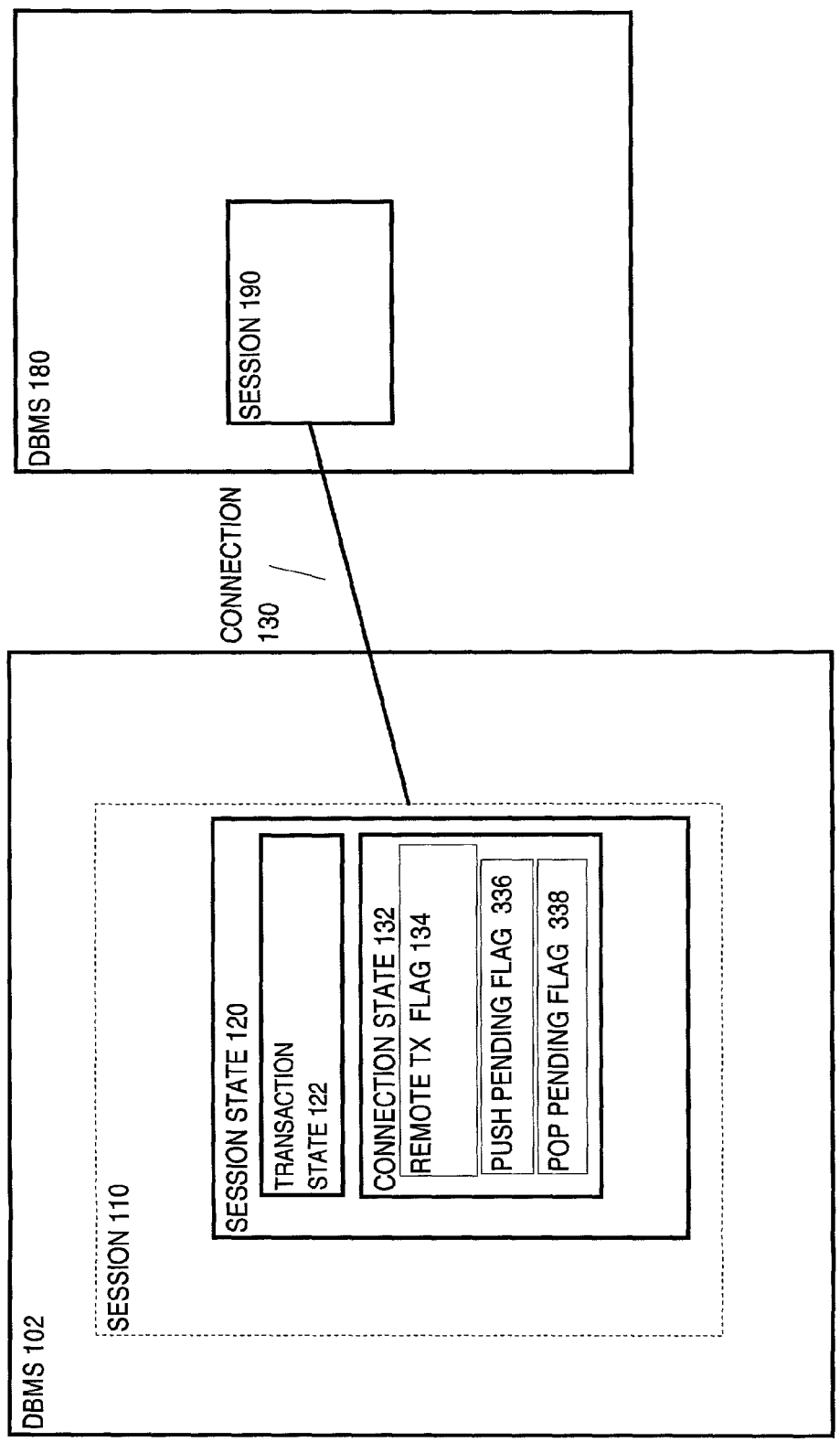
FIG. 3 is a block diagram depicting participants in a distributed transaction configured to use a piggybacked messaging mechanism for session reuse according to an embodiment of the present invention.
Figure 4:
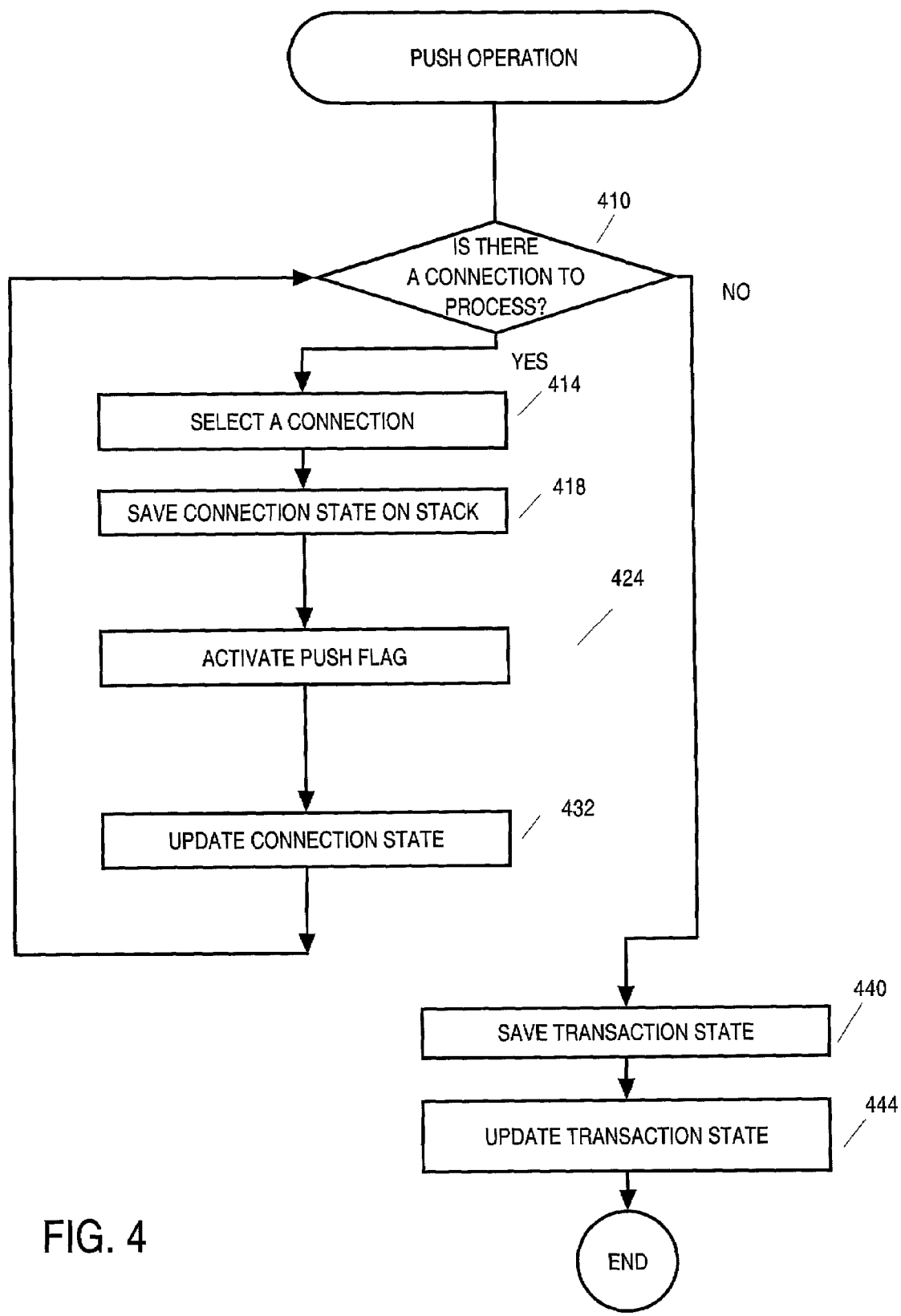
FIG. 4 is a flowchart depicting a process for performing a push operation according to an embodiment of the present invention.
Figure 5:
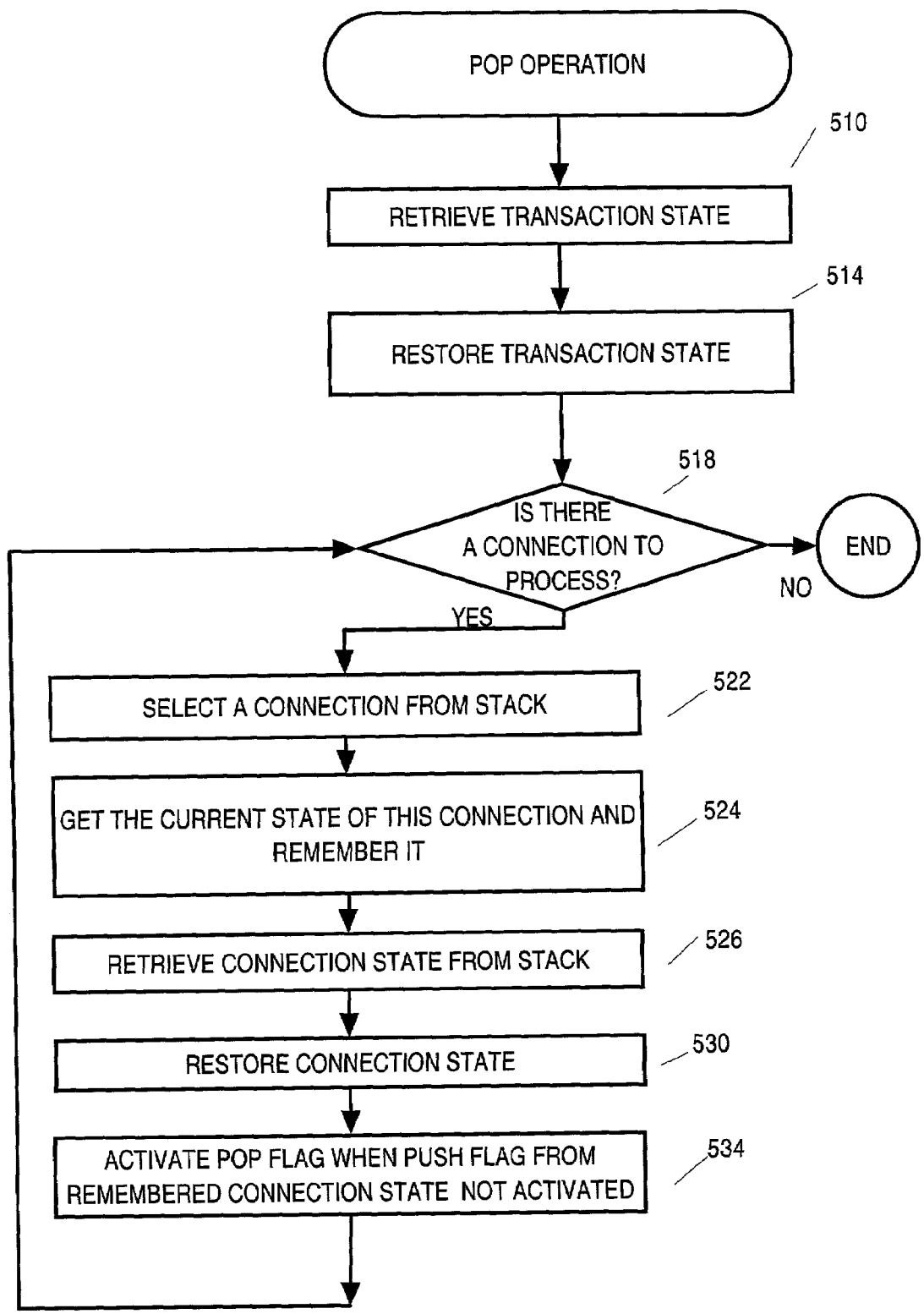
FIG. 5 is a flowchart depicting a process for performing a pop operation according to an embodiment of the present invention.

The overhead due to extraneous inter-process traffic and autonomous transaction creation mentioned above may be eliminated by using a deferred piggyback messaging mechanism. FIG. 3 is a block diagram showing DBMSs 102 as configured to support a piggyback messaging mechanism. FIG. 4 is a flowchart that shows a push operation that employs a piggyback messaging mechanism. FIG. 5 is a flowchart that shows the steps followed by the piggyback mechanism.

Referring to FIG. 3, it shows DBMS 102, including session 110, session state 120, transaction state 122, and connection state 132. Connection state 132 includes remote transaction state 122. In addition, connection state 132 includes push pending flag 336 and pop pending flag 336. As shall be described in greater detail, push pending flag 336 is used to flag when to piggyback a request to initiate an autonomous transaction on a remote participant. Pop pending flag 336 is used to indicate when to pop an autonomous transaction. Popping a transaction refers to the process of preparing a session state for recommencing execution of a containing transaction that was previously pushed.

Referring to FIG. 4, it shows a push operation. It is similar to the push operation shown in FIG. 2, with differences that include the following. No request to initiate an autonomous transaction is sent to a participant. At step 432, the connection state is updated to reflect that there is no active transaction. Rather than transmitting a message to start an autonomous transaction, at step 424, push pending flag 336 is activated, that is, set to a value that will cause DBMS 102 to later piggyback a request to initiate an autonomous transaction on DBMS 180. DBMS 180 executes a piggybacked request before acting upon any request in the forwarding message. Thus, if the piggybacked request to initiate an autonomous transaction is piggybacked to a forwarding message and the push pending flag is reset, and the forwarding message requests performance of transaction operations, then DBMS 180 honors the request to initiate the autonomous transaction before executing the request in the forwarding message. The autonomous transaction is thus begun before performing the requested transaction operation.

Popping

FIG. 5 shows the steps of a popping operation. The steps are performed after completing processing of an autonomous transaction to restore the session state, so that execution of the previously pushed containing transaction may be recommenced. The steps are illustrated using DBMS 102, which is performing the steps shown in FIG. 5 before recommencing TX102.

Referring to FIG. 5, at step 510, DBMS 102 retrieves the previously saved transaction state for TX102 from the stack. At step 514, DBMS 102 restores the pushed transaction, setting transaction state 102 to that retrieved from the stack. Execution proceeds to step 518.

Step 518 is part of an execution loop that is repeated for each connection state stored on the stack during the push operation for the pushed transaction. The loop includes steps 522, 526, 530, and 534. At step 518, DBMS 102 determines whether there is a connection whose state has been saved that has not already been processed by the loop. In this illustration, DBMS 102 determines that there is a connection to process, connection 130. At step 522, DBMS 102 selects connection 130. At step 524, DBMS 102 gets the current state of the connection remembers it. At step 526, DBMS 102 retrieves the connection state saved for the selected connection, connection 130. At step 530, DBMS 102 restores the connection state for the selected connection, setting connection state 132 to that retrieved from the stack.

At step 534, the pop pending flag for the connection state is activated, if the push pending flag of the connection state remembered at step 524 is not. If the push pending flag were activated, then a request to initiate an autonomous transaction was never sent for the connection. There is therefore no need to later send a request to the corresponding DBMS to pop an autonomous transaction.

Piggyback Requests to Push and Pop Transaction

Figure 6:
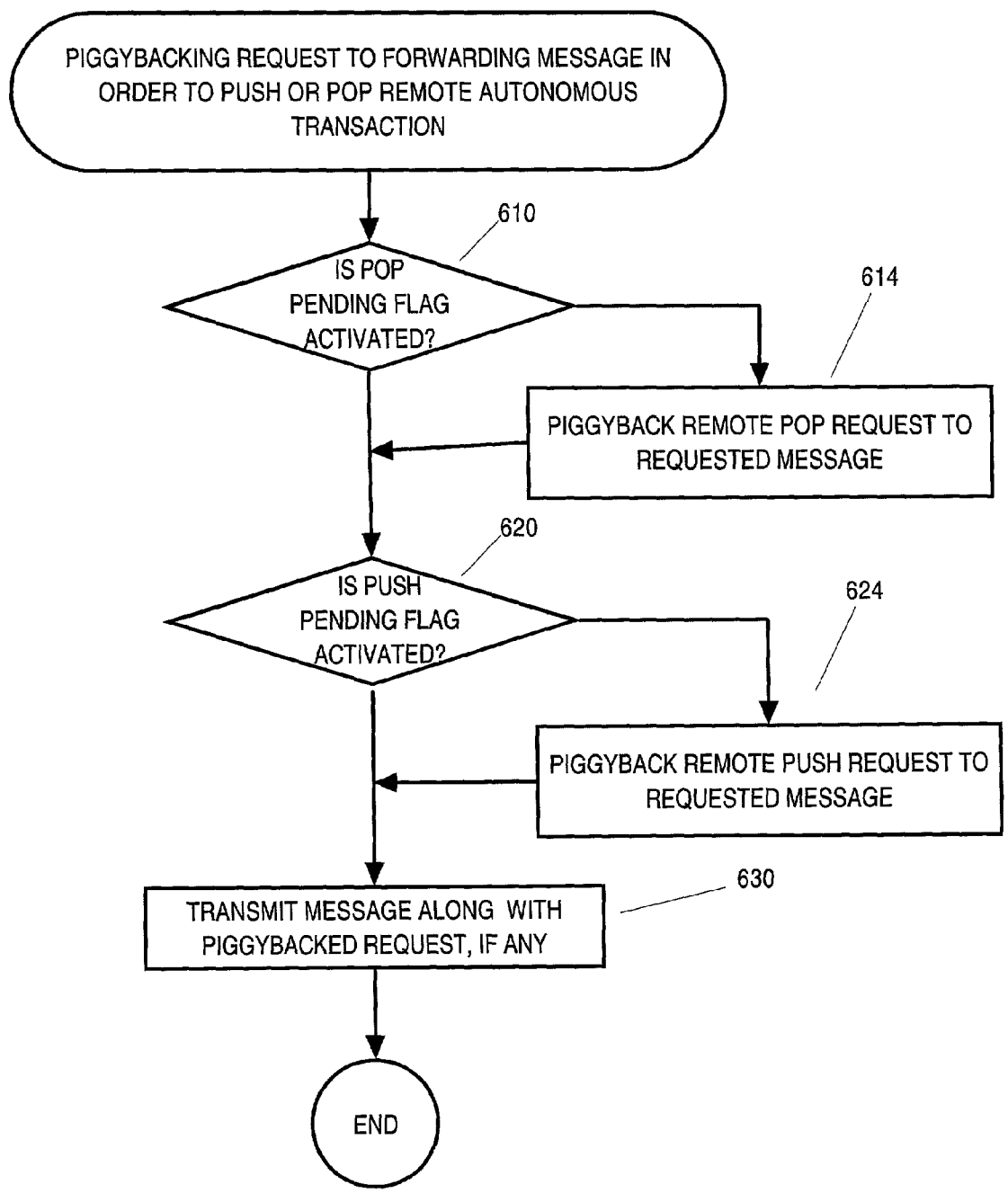
FIG. 6 is a flowchart depicting a process for piggybacking requests to initiate autonomous transactions and pop operations on remote participants according to an embodiment of the present invention.

FIG. 6 is a flowchart showing a process followed to piggyback requests to remote DBMS 102. The steps are followed by session processes of session 110 on DBMS 102 that use a connection to transmit a "requested" message to a remote DBMS during the session. Often, these messages are requests to execute transaction operations. The steps are illustrated using DBMS 102.

Referring to FIG. 6, at step 610, DBMS 102 determines whether the pop pending flag 336 has been activated. If the pop pending flag has been activated, then at step 614, the pop request is piggybacked to the requested message and the pop pending flag is reset. Control proceeds to step 620.

Referring to FIG. 6, at step 620, DBMS 102 determines whether the push pending flag 336 has been activated. If the push pending flag has been activated, then at step 624, a request to initiate an autonomous transaction is piggybacked to the requested message and the push pending flag is reset. When a pop request has already been piggybacked, the push request is piggybacked in a way that causes the pop request to be executed by the recipient DBMS before the push request. Control proceeds to step 630.

At step 630, the requested message is transmitted, along with any piggybacked request added at step 614 and 624, if any.

Figure 7:
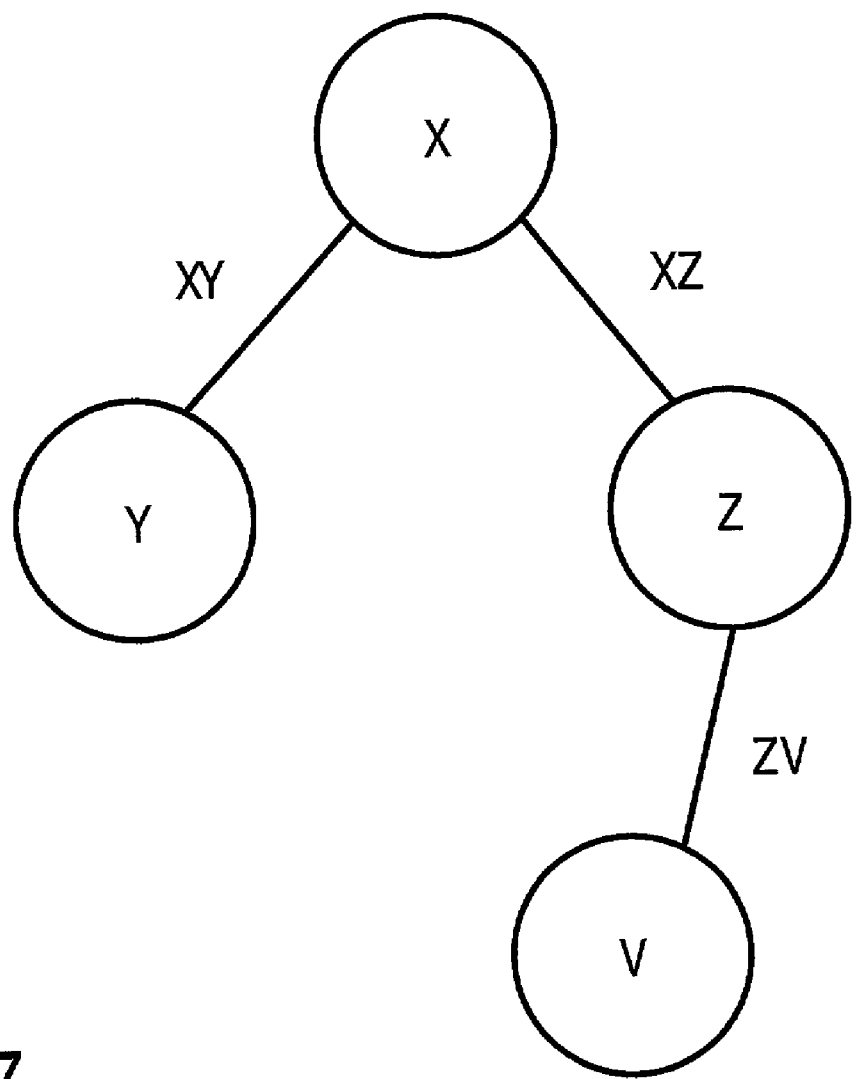
FIG. 7 is a block diagram of participants in a multi-level distributed transaction that use a piggybacked messaging mechanism for session reuse according to an embodiment of the present invention.

Piggybacked Messaging Implemented Recursively at all Levels of Distributed Transaction To fully realize its benefits, a piggybacked messaging system for session reuse may be implemented on all DBMSs that participate in a distributed transaction. FIG. 7 is a block diagram showing participants of a distributed transaction that implement the piggybacked messaging system.

Referring to FIG. 7, participants X, Y, Z, and V are executing a distributed transaction. Participant X is executing TX1, participant Y TX2, participant Z TX3, and participant V TX4. Participant X is connected to Y and Z via connections XY and ZY. Each of these connections XY and ZY has a connection state in the session state of a session on X. Z is connected to V via connection ZV, which has a connection state in the session state of a session on Z.

TX1 then begins a distributed autonomous transaction ATX1. To begin ATX1, participant X activates the push pending flags for connections XY and XZ. When X transmits a message to Y and Z to perform transaction operations for the distributed autonomous transaction, a request to initiate a transaction is piggybacked to the message and the push pending flag is reset for connections XY and XZ. In response to receiving the request to initiate the autonomous transaction, Z performs a push operation, setting the push pending flag for connection ZV.

When the distributed autonomous transaction is completed, the pop pending flag is activated for connections states XY, XZ, and ZV. When the Y, Z, and V receive a request to perform the work for the distributed transaction, they will perform a pop operation.

As shown above, piggybacked sessions are executed recursively by participants in a distributed transaction. When an autonomous distributed transaction is initiated, the participants not participating in the autonomous transaction are not sent messages that cause their session to be reused for the autonomous transaction.

The piggybacked session reuse approaches discussed herein are not limited to session reuse for distributed autonomous transactions. The approaches may be used for any distributed task being executed by participants, where there is a need for the participants to re-use sessions in a way that preserves session state needed for other tasks that are already using the sessions. In addition, the term transaction is not used herein to in any way limit the present invention to units of work that are executed on a database system or that are capable of being committed or rolled back on the database system or any other type of computer system.

Hardware Overview

Figure 8:
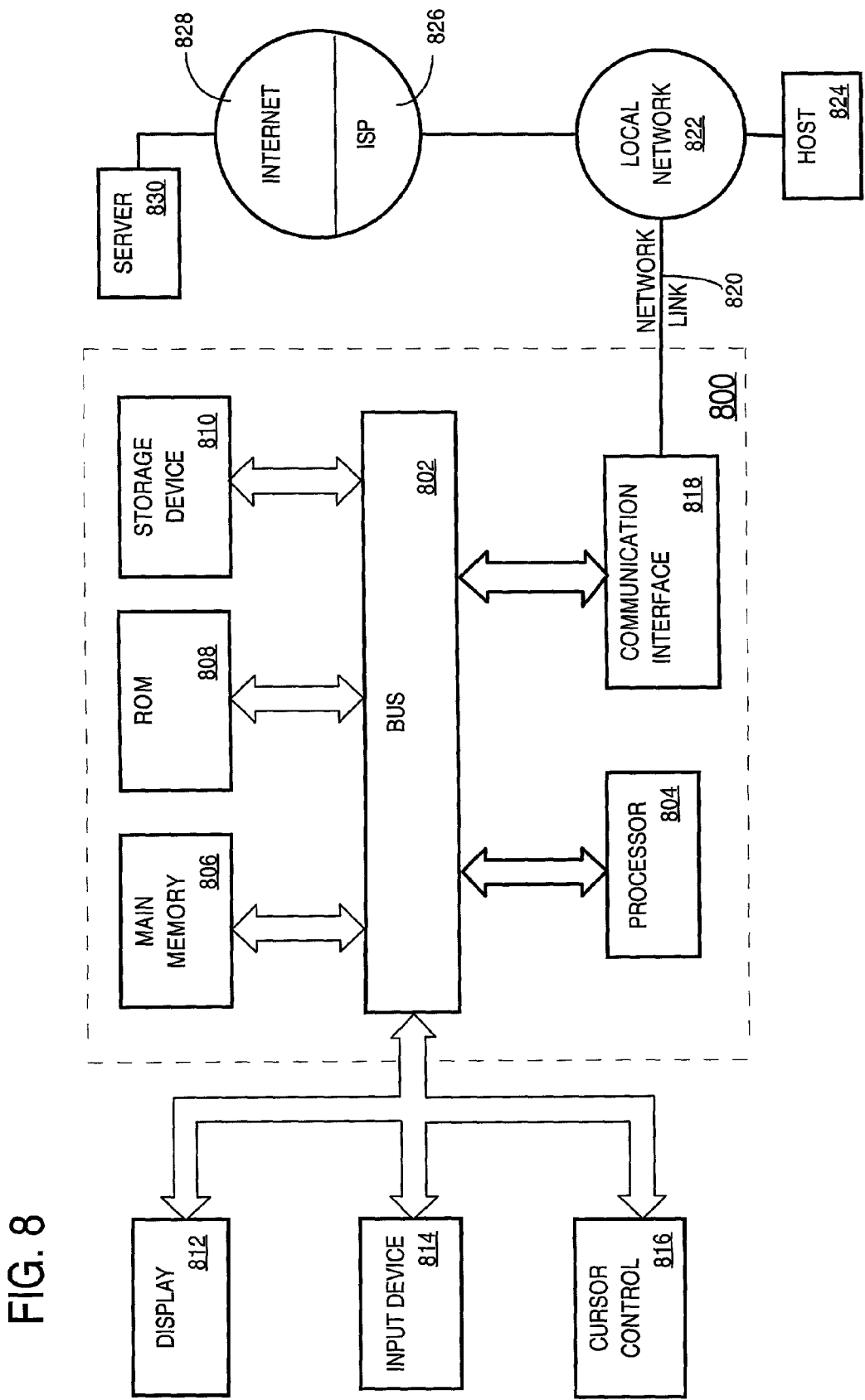
FIG. 8 is a block diagram of a computer system which may be used to implement an embodiment of the present invention.

FIG. 8 is a data item diagram that illustrates a computer system 800 upon which an embodiment of the invention may be implemented. Computer system 800 includes a bus 802 or other communication mechanism for communicating information, and a processor 804 coupled with bus 802 for processing information. Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Computer system 800 further includes a read only memory (ROM) 808 or other static storage device coupled to bus 802 for storing static information and instructions for processor 804. A storage device 810, such as a magnetic persistent storage or optical persistent storage, is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

The invention is related to the use of computer system 800 for implementing the techniques described herein. According to one embodiment of the invention, those techniques are performed by computer system 800 in response to processor 804 executing one or more sequences of one or more instructions contained in main memory 806. Such instructions may be read into main memory 806 from another computer-readable medium, such as storage device 810. Execution of the sequences of instructions contained in main memory 806 causes processor 804 to perform the process steps described herein. In alternative embodiments, hardwired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 804 for execution. Such a medium may take many forms, including but not limited to, non-volatile media, volatile media, and transmission media. Non-volatile media includes, for example, optical or magnetic persistent storages, such as storage device 810. Volatile media includes dynamic memory, such as main memory 806. Transmission media includes coaxial cables, copper wire and fiber optics, including the wires that comprise bus 802. Transmission media can also take the form of acoustic or light waves, such as those generated during radio-wave and infra-red data communications. Furthermore, the term "computer-readable storage medium" as used herein refers to any and all media that comes within the definition of "computer-readable medium" as used in this paper, excluding only those media not having a physical embodiment.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 804 for execution. For example, the instructions may initially be carried on a magnetic disk of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are exemplary forms of carrier waves transporting the information.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution. In this manner, computer system 800 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of managing reuse of sessions, the method comprising the steps:

preparing a first session state of a first session for subsequent execution of a first transaction and a second transaction, wherein the step of preparing the first session state includes setting a flag to indicate whether a second session has been prepared for subsequent execution of a third transaction and a fourth transaction;

after preparing the first session state of the first session, examining said flag to determine whether the second session has been prepared for said subsequent execution by both said third transaction and said fourth transaction; and if said second session has not been prepared, then causing a message to be transmitted which causes the preparing of the second session for said subsequent execution by both said third transaction and said fourth transaction;

wherein said first transaction and said third transaction are executed within a distributed transaction.

2. The method of claim 1, wherein the steps further include:

terminating said second transaction;

preparing said first session state of said first session for subsequent execution of said first transaction;

wherein the step of preparing said first session state of said first session for subsequent execution of said first transaction includes setting another flag to indicate whether the second session has been prepared for subsequent execution of said third transaction;

after preparing the first session state of the first session for subsequent execution of said first transaction, examining said other flag to determine whether the second session has been prepared for said subsequent execution of said third transaction; and if said second session has not been prepared for subsequent execution of said third transaction, then causing another message to be transmitted which causes the preparing of the second session for said subsequent execution of said third transaction.

3. The method of claim 1, wherein:

said first session state includes a first connection state describing a connection between processes executing within said first session and said second session; and wherein the step of preparing a first session state of a first session for subsequent execution of a first transaction and a second transaction includes modifying said first connection state for use by a process executing said second transaction.

4. The method of claim 3, wherein the step of modifying said first connection state includes modifying a particular flag that indicates no transaction is currently being executed within said second session.

5. The method of claim 1, wherein:

said first session state includes a first connection state describing a connection between processes executing within said first session and said second session; and wherein the step of preparing a first session state of a first session for subsequent execution of a first transaction and a second transaction includes saving at least a portion of said connection state for subsequent use by a process executing said first transaction.

6. The method of claim 1, wherein the steps further include setting, if said message is transmitted, the flag to indicate that said second session has been prepared for subsequent execution of said third transaction and said fourth transaction.

7. The method of claim 1, wherein the steps include:

terminating said second transaction;

preparing said first session state of said first session for subsequent execution of said first transaction;

wherein the step of preparing said first session state of said first session for subsequent execution of said first transaction includes:

examining said flag to determine whether the second session was prepared for said subsequent execution of said third transaction and said fourth transaction; and setting another flag to indicate whether the second session has been prepared for subsequent execution of said third transaction if said second session has not been prepared for subsequent execution of said third transaction.

8. The method of claim 1, wherein the step of causing a message to be transmitted includes piggybacking a request to the message.

9. The method of claim 1, wherein a distributed transaction includes said first transaction and third transaction.

10. The method of claim 1, wherein said second and fourth transactions are autonomous transactions.

11. A computer-readable storage medium carrying one or more sequences of instructions for managing reuse of sessions, wherein execution of the one or more sequences of instructions by one or more processors causes the one or more processors to perform the steps of:

preparing a first session state of a first session for subsequent execution of a first transaction and a second transaction, wherein the step of preparing the first session state includes setting a flag to indicate whether a second session has been prepared for subsequent execution of a third transaction and a fourth transaction;

after preparing the first session state of the first session, examining said flag to determine whether the second session has been prepared for said subsequent execution by both said third transaction and said fourth transaction; and if said second session has not been prepared, then causing a message to be transmitted which causes the preparing of the second session for said subsequent execution by both said third transaction and said fourth transaction;

wherein said first transaction and said third transaction are executed within a distributed transaction.

12. The computer-readable storage medium of claim 11, wherein the steps further include:

terminating said second transaction;

preparing said first session state of said first session for subsequent execution of said first transaction;

wherein the step of preparing said first session state of said first session for subsequent execution of said first transaction includes setting another flag to indicate whether the second session has been prepared for subsequent execution of said third transaction;

after preparing the first session state of the first session for subsequent execution of said first transaction, examining said other flag to determine whether the second session has been prepared for said subsequent execution of said third transaction; and if said second session has not been prepared for subsequent execution of said third transaction, then causing another message to be transmitted which causes the preparing of the second session for said subsequent execution of said third transaction.

13. The computer-readable storage medium of claim 11, wherein:

said first session state includes a first connection state describing a connection between processes executing within said first session and said second session; and wherein the step of preparing a first session state of a first session for subsequent execution of a first transaction and a second transaction includes modifying said first connection state for use by a process executing said second transaction.

14. The computer-readable storage medium of claim 13, wherein the step of modifying said first connection state includes modifying a particular flag that indicates no transaction is currently being executed within said second session.

15. The computer-readable storage medium of claim 11, wherein:

said first session state includes a first connection state describing a connection between processes executing within said first session and said second session; and wherein the step of preparing a first session state of a first session for subsequent execution of a first transaction and a second transaction includes saving at least a portion of said connection state for subsequent use by a process executing said first transaction.

16. The computer-readable storage medium of claim 11, wherein the steps further include setting, if said other message is transmitted, the flag to indicate that said second session has been prepared for subsequent execution of said third transaction and said fourth transaction.

17. The computer-readable storage medium of claim 11, wherein the steps include:
 terminating said second transaction;
 preparing said first session state of said first session for subsequent execution of said first transaction;
 wherein the step of preparing said first session state of said first session for subsequent execution of said first transaction includes:
  examining said flag to determine whether the second session was prepared for said subsequent execution of said third transaction and said fourth transaction; and setting another flag to indicate whether the second session has been prepared for subsequent execution of said third transaction if said second session has not been prepared for subsequent execution of said third transaction.

18. The computer-readable storage medium of claim 11, wherein the step of causing a message to be transmitted includes piggybacking a request to the message.

19. The computer-readable storage medium of claim 11, wherein a distributed transaction includes said first transaction and third transaction.

20. The computer-readable storage medium of claim 11, wherein said second and fourth transactions are autonomous transactions.

\* \* \* \* \*

UNITED STATES PATENT AND TRADEMARK OFFICE
CERTIFICATE OF CORRECTION

PATENT NO. : 7,346,690 B1 Page 1 of 1
APPLICATION NO. : 10/160128
DATED : March 18, 2008
INVENTOR(S) : Sinha et al.

It is certified that error appears in the above-identified patent and that said Letters Patent is hereby corrected as shown below:

On page 2, in column 2, under "Other Publications", line 3, delete "< http:" and insert -- <http: --, therefor.

On page 2, in column 2, under "Other Publications", line 17, delete "Nov. 11, 2005," and insert -- Nov. 2, 2005, --, therefor.

On page 2, in column 2, under "Other Publications", line 18, after "EP 99 968 071.3" insert -- , --.

In column 1, line 8–9, delete "MECHANIISM" and insert -- MECHANISM --, therefor.

Signed and Sealed this

Third Day of November, 2009

David J. Kappos
*Director of the United States Patent and Trademark Office*